INVENTORS.
HENRY J. SCHULTZ
BROOKS WALKER
BY
Brooks Walker

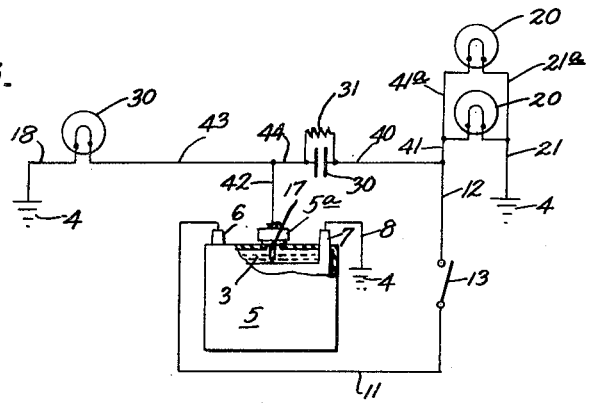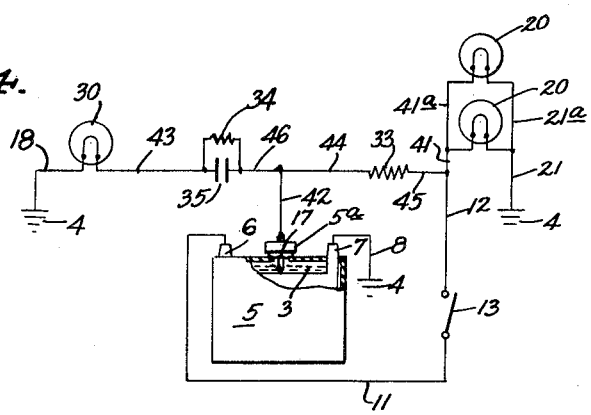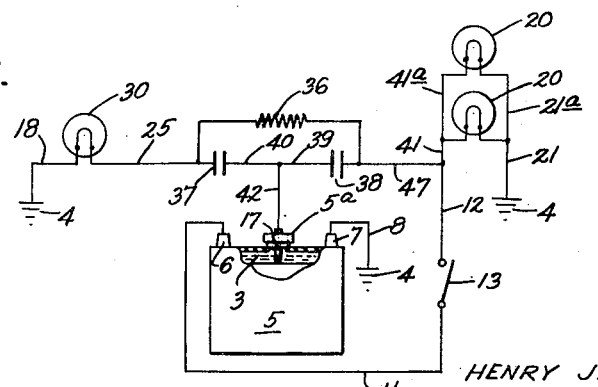

2,779,015
Patented Jan. 22, 1957

2,779,015

DEPTH INDICATOR FOR CONDUCTIVE LIQUID

Brooks Walker, Piedmont, and Henry J. Schultz, Hayward, Calif.; said Schultz assignor to said Walker Application April 11, 1955, Serial No. 500,367

10 Claims. (Cl. 340—249)

This invention pertains to improvements in indicators for showing when the liquid level in a battery container with a conductive liquid is below a predetermined level.

There have been previous methods of indicating when the liquid in a battery is low, which involved the use of a probe, such as the co-pending application entitled "Battery Tester," U. S. Patent application No. 477,815, by Henry J. Schultz, assigned to Brooks Walker.

This invention involves the use of a switch, which could be a vehicle starter's switch or the foot brake signal switch, both of which are already on the car, as shown in said pending application, a tail light and an indicator light connected to the probe by means of a double unit condenser in such a way that when the switch is closed to light the tail light, current flows through the condenser in a limited impulse to the probe and to ground so that the indicator light does not light when the probe is in the conductive liquid. When the liquid in the battery is below the bottom of the probe, then the probe does not short out the double condenser and an impulse will flow through the double condenser to the indicator light giving a flash of light on the indicator whenever the pedal is pressed or released if the liquid in the battery is low—thus indicating that the battery needs attention. A small high resistance can be placed across the double condenser so as to discharge it in between applications of the switch so that it will be ready to give a flash on each application of the brakes if the brake switch is used and in case the liquid in the battery is below the probe. The same circuit can be used with any type of switch and any type of conductive liquid in a container to indicate whenever the conductive liquid in the container is below the probe. In the application to a conductive liquid exactly the same circuit is used with an outside source of electrical energy applied to the circuit.

A further object of the invention is to incorporate the components of the circuit in a small compact unit that can be readily mounted in some place visible to the operator, such as the instrument panel. The components in this invention are all mounted in the same compact unit, including the double condenser, the resistance, the indicator light, which can all be mounted through an opening in the instrument panel to be visible to the operator, the mounting support can include a simple ground connection. The same unit could be clamped underneath the instrument panel in a normal manner to avoid drilling the instrument panel. This will require only one wire going from one side of the dual condensers in the unit to the probe in the battery. The probe is preferably inserted through one of the battery filler caps. The unit will have a connection from one side of the indicator light to some place on the instrument panel which is already grounded in most cases and can be included in the mounting; another lead from the unit will go to a hot contact on the instrument panel, such as one side of the ignition switch.

Another object of the invention is to provide a flash of light when a switch is closed or opened if the liquid in the battery or the liquid in the container is below a predetermined level.

Another object of the invention is to provide a testing circuit for indicating when a conductive liquid is below a predetermined level and preventing further use of electrical energy after closing the switch and getting the first flash of light even if the switch is left closed, thus conserving battery energy or electric energy.

Another object is to provide a circuit that will accomplish the above results by the use of a single condenser only in the circuit.

Another object is to use the stoplight switch as the switch for controlling the battery tester circuit.

Another feature is to limit the flow of current to the condenser by a resistance between the switch and the probe to limit the current flow to an amount not larger than one or two instrument lights require and place the condenser between the probe and the indicator light to provide the flash of light only when the probe is above the liquid.

Another feature is to provide a double condenser in the indicator light circuit with a resistance across it that will discharge the condenser rapidly between switch closings and still not flash the indicator light when the probe is in the battery or conductive liquid.

Other objects of the invention will be more particularly pointed out in the accompanying specification and claims.

We have illustrated our invention in the accompanying drawings, in which:

Fig. 3 is a composite drawing, partly diagrammatic, and with the end elevation of a battery partly in section, showing another modification of the invention.

Fig. 4 is a composite drawing, partly diagrammatic, and with the end elevation of a battery partly in section, showing another form of the invention.

Fig. 5 is a composite drawing, partly diagrammatic, and with the end elevation of a battery partly in section, showing another form of the invention.

In all figures, like numerals of reference refer to corresponding parts.

Figure 1:
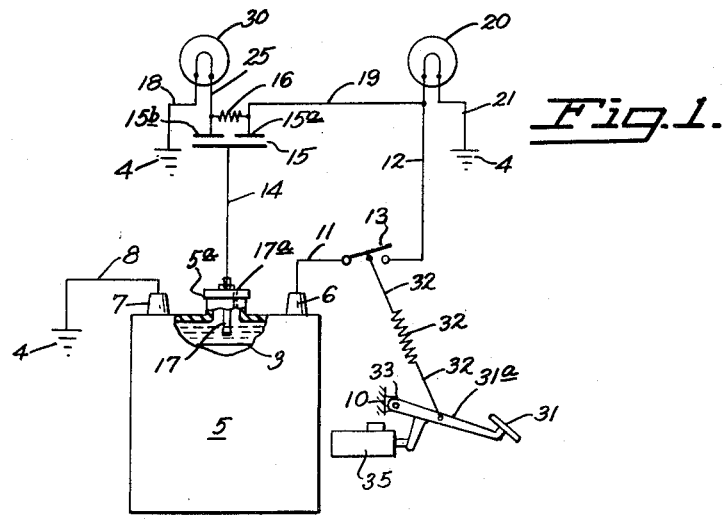
Fig. 1 is a composite diagrammatic view and an end view of a battery partly cut away, showing one form of the invention.

In Fig. 1 we have shown a battery 5, a ground terminal 7, connected by wire 8 to ground 4. The battery has a filler cap 5a through which is inserted and positioned a probe 17. The cap has an off-center vent hole 17a to allow breathing of the inside of the battery or escape of such gases as may be generated in that particular cell of the battery. Hot terminal 6 of the battery is connected by a wire 11 to switch 13 which may be a manually operated switch, a foot brake operated switch, starter switch, etc., the last two of which are common to most automotive vehicles. From switch 13 line 12 leads to stoplight 20 which in turn is grounded on one side by line 21 to ground 4. This light can be of the single contact or double contact type. Line 19 connects to line 12 and goes to side 15a of condenser 15. Condenser 15 is of a double type in which side 15a and side 15b have two separate outlet terminals. Condenser side 15a is connected to line 19, and 15b to line 25. Line 25 goes to one side of the indicator bulb 30; the other side of bulb 30 is grounded by wire 18 or from a grounded socket, as is common with a single contact bulb. Resistance 16 may be connected across the two sides 15a and 15b of the condenser 15 by connecting resistance 16 between line 19 and line 25. When switch 13 is open, any charge on the two sides of condenser 15a and 15b will be dissipated through the bulbs 30 and 20 to ground 4 which is connected to bulbs 20 and 30 respectively. If the condenser 15 has a built-in resistance or loss, no exterior resistance may be required. Resistance 16 may be needed to discharge condenser 15 if bulbs 20 or 30 are burned out. Switch 13 is closed, either manually or by pressing the foot brake, or by closing the starter circuit—depending upon which type of switch is employed.

Switch 13 may be operated by foot pedal 31, pedal support arm 31a, pull cord 32, and spring 32a where foot pedal 31 is pivoted at 33 of the vehicle body 10 and operates master cylinder 35 in a conventional manner. When this switch 13 is closed, in any manner as described above, current flows from terminal 6 through line 11, switch 13, line 12, to a tail stoplight 20, and to ground 4 through line 21, so that a tail stoplight 20 will light when the brake pedal 31 is depressed. Line 19 will also be energized to side 15a of condenser 15 and side 15b will also be charged, providing a flash of light in indicator light 30 by a surge of current from condenser 15, through line 25, and a ground connection 18, provided probe 17 is not contacting liquid 3 in battery 5. If probe 17 is in liquid 3 of battery 5, current will flow from line 19 through condenser 15a and on through a line 14, probe 17, to liquid 3, which is grounded through ground terminal 7 and wire 8. Any charge which has been built up on the condenser 15b and 15a will be dissipated when switch 13 is opened by the resistance 16 which allows flow from both sides of the condenser 15a and 15b and also through current flow through the filaments of indicator light 30 and stoplight 20 to ground through these connecting wires, causing a second flash of light 30 if the filament in light 20 is functioning. If filament in light 20 is out, resistance 16 will discharge condenser 15 more slowly allowing a second cycle to function when switch 13 is closed again.

Figure 2:
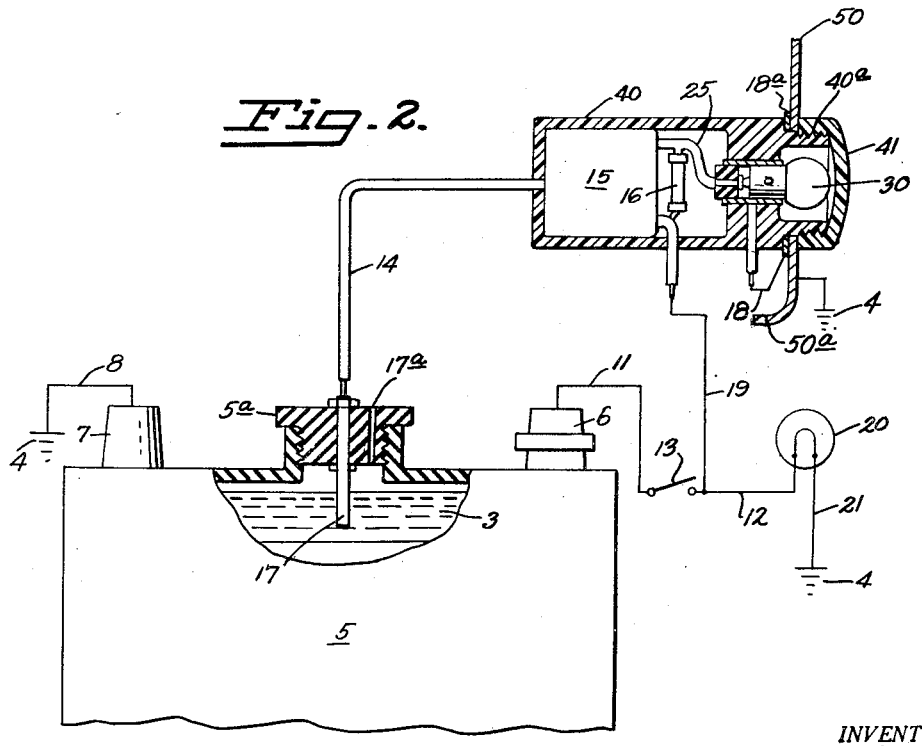
Fig. 2 is a composite drawing, partly diagrammatic, with the end view of a battery partly cut away and partly in section, and with an indicator unit in section, showing another form of the invention.

In order to make this entire unit as compact as possible for easy installation, we have shown in Fig. 2 where condenser 15 is mounted in a plastic case 40 which is mounted on instrument panel 50 by inserting the threaded portion 40a through an opening in the instrument panel 50 and then screwing on transparent cover 41 over bulb 30. A small resistance 16 may be connected between lines 25 and 19 inside of the plastic container, and line 18 connects the socket of bulb 30 to washer 18a which is grounded by instrument panel 50. A single contact bulb 30 may be used. By this construction it can be seen that a small, compact unit in container 40 merely needs to be connected by wire 14 to probe 17 mounted in battery cap 5a, and then mounted through a hole in instrument panel 50 or in a bracket which clamps to the lower lip 50a of the instrument panel in a conventional manner. Another short connection 19 goes from one side of condenser 15 to a switch 13, such as has been described. The probe 17 should be lead or other suitable material and can be in any cell + or —.

In Fig. 3 we have shown a circuit in which a single condenser 30 is used between line 12 from switch 13 and probe 17. The operation is as follows when switch 13 is closed: current flows from terminal 6, line 11, through switch 13, line 12, lines 41 and 41a, to stoplights 20, lines 21a and 21, to ground to cause stoplights 20 to light in a conventional manner. At the same time a surge of current will flow from line 12, line 40, through condenser 30, resistance 31, line 44, line 42, to probe 17, and a small amount of current will flow through line 43, indicator light 30, line 18, to ground 4, but not enough to light indicator light 30, provided probe 17 is immersed in battery liquid 3. When battery liquid 3 is below the bottom of probe 17, no current will flow through line 42 to probe 17 and the surge of current passing condenser 30 will flow from line 12, line 40, condenser 30, resistance 31, line 44, line 43, indicator bulb 30, line 18 to ground 4, to cause a flash of light in indicator light 30 when switch 13 is closed and again when switch 13 is opened to indicate that the battery fluid needs attention and refilling. If condenser 30 has a built-in resistance which is common with many condensers, or if the filaments of indicator light 30 and stoplight 20 are intact, current flow through these filaments to ground 4 will discharge condenser 30 giving a flash of light 30 and resistance 31 may not be needed.

In this case the probe is in the ground cell and preferably made of lead or other suitable material. The ground cell may be positive or negative polarity. Values of the components which have been found to function satisfactorily in this circuit are: battery, 6 volts; bulb 30, use a #49 bulb; the condenser is a 500–1000 mf. rating at battery voltage; the stoplights 20 are of conventional automotive rating; resistance or bleeder 31 is 1 kΩ. Other values may give satisfactory or better results.

In Fig. 4 the action is about the same as in Fig. 3. A flash of light is obtained when switch 13 is closed or opened in indicator light 30 through condenser 35 if probe 17 is above battery liquid level 3, and no flash will result if battery liquid level 3 is above the bottom of probe 17.

The operation is as follows: when switch 13 is closed, stop tail lights 20 will light as in Fig. 3, and a surge of current will flow through from hot line 12, line 45, resistance 33, line 44, line 46, condenser 35, line 43, indicator light 30, line 18, to ground 4, to cause indicator light 30 to flash, provide probe 17 is above battery liquid 3. Condenser 35 will be discharged through the filaments of lights 30 and 20 when switch 13 is opened, giving a flash of light 30. If the filaments in lights 20 are out, condenser 35 will be discharged through resistance 34 between flashes. If probe 17 is below battery liquid 3, current will flow from line 12 (when switch 13 is closed), line 45, resistance 33, line 44, line 42, to probe 17, and battery liquid 3. A small amount of current will flow through line 46, condenser 35, line 43, indicator light 30, line 18, to ground 4. This current will not light the indicator light 30.

Values of the components which have been found will give satisfactory results with a six volt battery are: indicator light #49; resistance 34 of 1kΩ rating; condenser 35 of 500 to 1000 mf. at 6 volts; stoplights 20 of standard automobile type. Other values may be satisfactory.

In Fig. 5 the operation is essentially the same as in Fig. 1 except that two condensers are used in place of double condenser 15. The operation is as follows: when switch 13 is closed, stoplights 20 are lighted, as in Fig. 3, and indicator light 30 will flash if probe 17 is above battery liquid 3 by a surge of current from hot line 12, line 47, condenser 38, line 39, line 40, condenser 37, line 25, indicator light 30, line 18 to ground.

Values of components which work are as follows: indicator light 30, use #49; condensers 37 and 38, use 500 mf. at 6 volts; resistance 36, use 1 kΩ rating; stoplights, use standard automobile practice.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim as our invention:

1. A tester for the level of a conductive liquid in a container, including in combination: a ground for said container; a source of direct-current electromotive energy; a switch, condenser means, and electrically responsive indicator means connected in series with said source; resistance means in shunt with said condenser means; and a probe in parallel with at least said indicator means positioned to probe from above down to a predetermined depth only if said liquid, whereby when said switch is closed a surge of direct current from said source passes through said condenser and, when said probe contacts said liquid, through said liquid to ground, said surge, when said probe does not contact said liquid, passing to said indicator means and actuating it.

2. The tester of claim 1, wherein said condenser means comprises two insulated plates on one side of a condenser and single plate on the opposite side, said single plate being connected to said probe, one of said two plates being connected to said source and the other to said indicator means, said resistance means being connected across said two plates.

3. The tester of claim 1, wherein said source is a storage battery and said liquid is the liquid in said battery.

4. The tester of claim 3, wherein said switch comprises a stop-light switch on a brake-pedal of an automotive vehicle and said combination includes stop-light means in parallel with said condenser means, resistance means indicator means, and probe.

5. The tester of claim 1, wherein said probe and indicator means are in parallel with each other and in series with said resistance-means-shunted condenser means.

6. The tester of claim 1, wherein said probe is in parallel with both said indicator means and said resistance-means-shunted condenser means, which are in series with each other.

7. The tester of claim 1, wherein said condenser means comprises two condensers in series, said resistance means extending across in parallel with the two-condenser series, said indicator means is in series with said two-condenser series and said resistance means, and said probe is connected in between said two condensers.

8. A battery-liquid level testing device, comprising a storage battery having a hot lead, a grounded lead, and battery liquid; a series circuit having a switch, condenser means, and an indicator means; and a probe extending in said battery liquid to a predetermined level and connected electrically in parallel with a portion of said circuit beyond said switch, said portion including said indicator means, whereby closing said switch when said battery liquid is in contact with said probe serves merely to ground a pulse of direct current through said probe and liquid, while closing said switch when said liquid has dropped below said probe serves to send a surge of current through said condenser means to said indicator means.

9. The device of claim 8, wherein a resistor is provided in parallel with said condenser means.

10. The device of claim 8, wherein said condenser means comprises a split condenser having two plate sections on one side and a third plate on the opposite side, said probe being connected to said third plate, one of said two plates being connected to said indicator means and the other to said switch.

References Cited in the file of this patent

UNITED STATES PATENTS

| | | |
|---|---|---|
| 2,161,441 | Vickers | June 6, 1939 |
| 2,618,248 | Lindberg | Nov. 18, 1952 |
| 2,663,862 | De Anthony | Dec. 22, 1953 |

FOREIGN PATENTS

| | | |
|---|---|---|
| 58,633 | France | Oct. 21, 1953 |